United States Patent
Scheuerlein et al.

(10) Patent No.: US 9,152,562 B2
(45) Date of Patent: *Oct. 6, 2015

(54) STORAGE SUB-SYSTEM FOR A COMPUTER COMPRISING WRITE-ONCE MEMORY DEVICES AND WRITE-MANY MEMORY DEVICES AND RELATED METHOD

(75) Inventors: Roy E. Scheuerlein, Cupertino, CA (US); Randhir Thakur, Fremont, CA (US); Christopher Moore, San Jose, CA (US)

(73) Assignee: SanDisk 3D LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,986

(22) Filed: Sep. 14, 2012

(65) Prior Publication Data
US 2013/0013847 A1    Jan. 10, 2013

Related U.S. Application Data

(63) Continuation of application No. 11/967,987, filed on Dec. 31, 2007, now Pat. No. 8,275,927.

(51) Int. Cl.
| | |
|---|---|
| *G06F 12/06* | (2006.01) |
| *G06F 11/14* | (2006.01) |
| *G06F 12/14* | (2006.01) |

(52) U.S. Cl.
CPC ........ *G06F 12/0638* (2013.01); *G06F 11/1415* (2013.01); *G06F 12/1425* (2013.01); *G06F 2212/2142* (2013.01)

(58) Field of Classification Search
CPC ............ G06F 12/0638; G06F 12/1425; G06F 11/1415; G06F 2212/2022
USPC ................ 711/103, 154, 156, 163, 102, 104; 365/51, 52, 94, 96
See application file for complete search history.

(56) References Cited

U.S. PATENT DOCUMENTS

| | | | |
|---|---|---|---|
| 5,666,293 A | 9/1997 | Metz et al. | |
| 5,694,382 A | 12/1997 | Oliver et al. | |
| 6,034,882 A | 3/2000 | Johnson et al. | |
| 6,189,014 B1 * | 2/2001 | Nakashima et al. | 1/1 |
| 6,266,272 B1 | 7/2001 | Kirihata et al. | |

(Continued)

FOREIGN PATENT DOCUMENTS

| | | |
|---|---|---|
| EP | 1 199 636 | 4/2002 |
| EP | 1 764 687 | 3/2007 |
| WO | WO 01/52065 | 7/2001 |

OTHER PUBLICATIONS

Supplemental Notice of Allowance and Examiner Interview Summary of related U.S. Appl. No. 11/967,987 mailed Jul. 19, 2012.

(Continued)

*Primary Examiner* — Reginald Bragdon
*Assistant Examiner* — Mehdi Namazi
(74) *Attorney, Agent, or Firm* — Dugan & Dugan, PC

(57) ABSTRACT

Methods and apparatus for a solid state non-volatile storage sub-system of a computer is provided. The storage sub-system may include a write-many storage sub-system memory device including write-many memory cells, a write-once storage sub-system memory device including write-once memory cells, and a page-based interface that is adapted to read and write the write-once and write-many storage sub-system memory devices. Numerous other aspects are provided.

19 Claims, 8 Drawing Sheets

(56) References Cited

U.S. PATENT DOCUMENTS

| | | | |
|---|---|---|---|
| 6,424,581 | B1 | 7/2002 | Bosch et al. |
| 6,542,979 | B1 * | 4/2003 | Eckardt .................... 711/173 |
| 6,584,541 | B2 | 6/2003 | Friedman et al. |
| 6,591,376 | B1 | 7/2003 | VanRooven et al. |
| 6,675,276 | B2 | 1/2004 | Schulze et al. |
| 6,711,043 | B2 | 3/2004 | Friedman et al. |
| 6,768,661 | B2 | 7/2004 | Vyvoda et al. |
| 6,895,490 | B1 | 5/2005 | Moore et al. |
| 6,996,660 | B1 * | 2/2006 | Moore et al. ............ 711/102 |
| 7,062,602 | B1 | 6/2006 | Moore et al. |
| 2003/0115404 | A1 | 6/2003 | Hogan |
| 2004/0003191 | A1 | 1/2004 | Minne |
| 2004/0123064 | A1 * | 6/2004 | Moore et al. ............ 711/170 |
| 2005/0171983 | A1 * | 8/2005 | Deo et al. ............... 707/202 |
| 2006/0149859 | A1 | 7/2006 | Dubal et al. |
| 2006/0288153 | A1 | 12/2006 | Tanaka et al. |
| 2007/0124341 | A1 * | 5/2007 | Lango et al. ............ 707/202 |
| 2008/0016132 | A1 | 1/2008 | Merhar |
| 2008/0197877 | A1 * | 8/2008 | Cox et al. ................. 326/38 |
| 2009/0113116 | A1 * | 4/2009 | Thompson et al. ....... 711/103 |
| 2009/0172321 | A1 | 7/2009 | Scheuerlein et al. |

OTHER PUBLICATIONS

Aug. 3, 2012 Reply to Office Action of related Chinese Patent Application No. 200880123684.7.

Notice of Allowance and Examiner Interview Summary of related U.S. Appl. No. 11/967,987 mailed May 23, 2012.

Office Action of related Chinese Patent Application No. 200880123684.7 dated Apr. 1, 2012.

May 3, 2012 Amended Claims and Response to Oct. 5, 2011 Supplementary European Search Report of related European Patent Application No. 08869429.4.

Mar. 9, 2012 Response to Dec. 9, 2011 Office Action of related U.S. Appl. No. 11/967,987.

Office Action of related U.S. Appl. No. 11/967,987 mailed Dec. 9, 2011.

Supplementary European Search Report of related European Patent Application No. 08869429.4 mailed Oct. 5, 2011.

Oct. 10, 2011 Reply to Jul. 11, 2011 Office Action of U.S. Appl. No. 11/967,987.

Office Action of U.S. Appl. No. 11/967,987 mailed Jul. 11, 2011.

Jun. 2, 2011 Reply to Mar. 3, 2011 Office Action of related U.S. Appl. No. 11/967,987.

Office Action of U.S. Appl. No. 11/967,987 mailed Mar. 3, 2011.

International Search Report and Written Opinion of International Application No. PCT/US2008/088616 mailed Jun. 29, 2009.

Office Action of related Chinese Patent Application No. 200880123684.7 Dec. 21, 2012.

Office Action of related Chinese Patent Application No. 200880123684.7 Jul. 31, 2013.

Oct. 15, 2013 Response to Jul. 31, 2013 Office Action of related Chinese Patent Application No. 200880123684.7.

Mar. 5, 2013 Response to Dec. 21, 2012 Office Action of related Chinese Patent Application No. 200880123684.7.

* cited by examiner

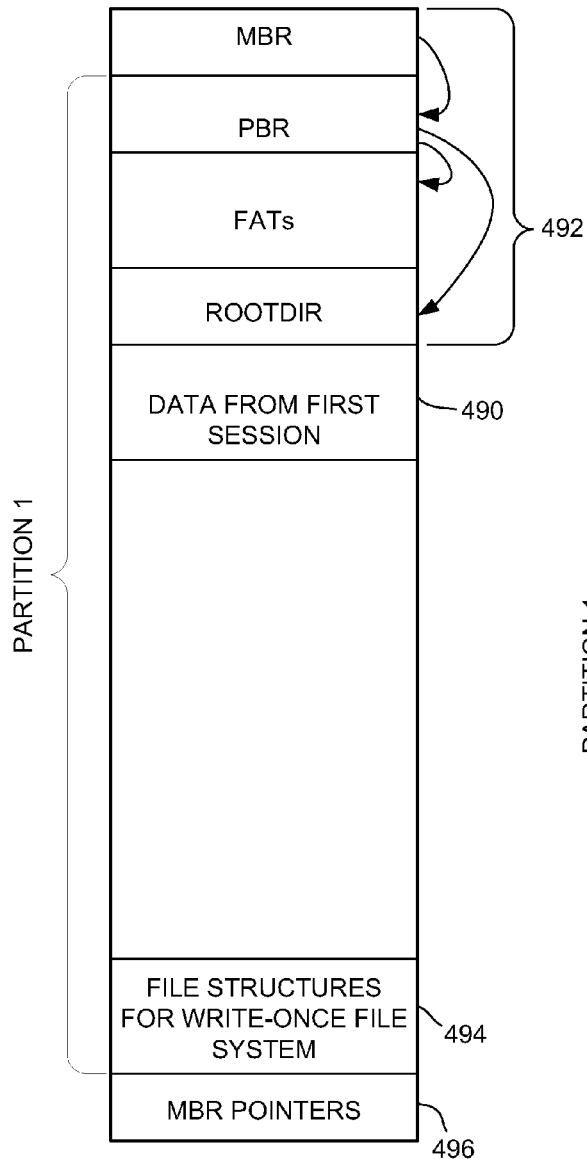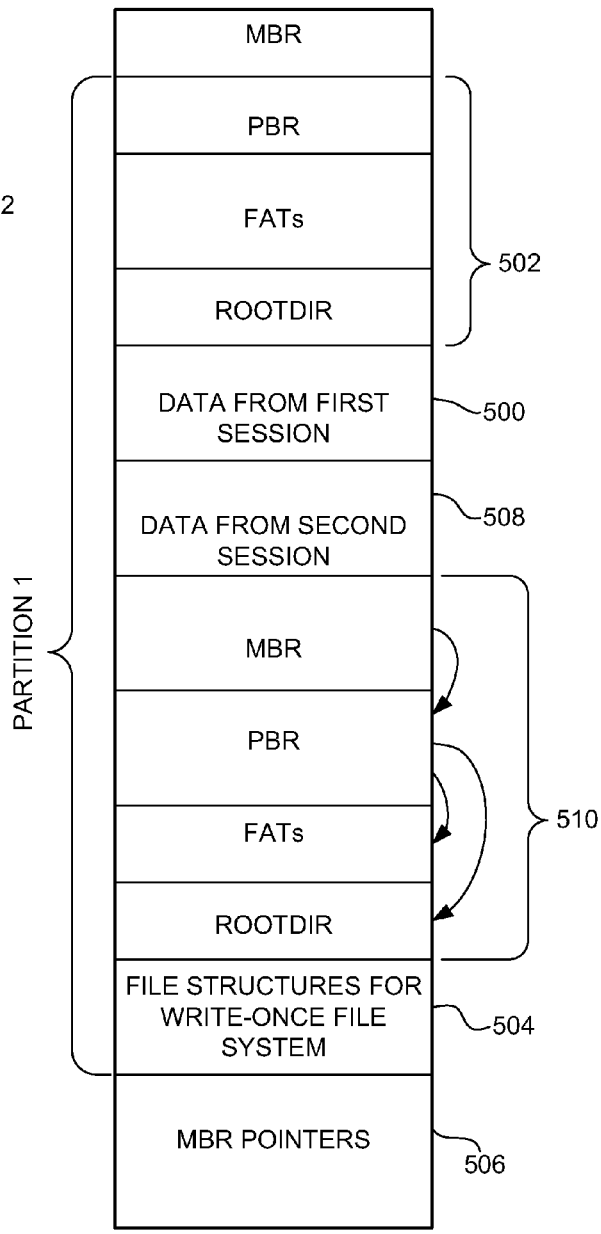
FIG. 4C
FIG. 5

STORAGE SUB-SYSTEM FOR A COMPUTER COMPRISING WRITE-ONCE MEMORY DEVICES AND WRITE-MANY MEMORY DEVICES AND RELATED METHOD

REFERENCE TO RELATED APPLICATIONS

This application is a continuation of U.S. patent application Ser. No. 11/967,987, filed Dec. 31, 2007, now U.S. Pat. No. 8,275,927, which is incorporated by reference herein in its entirety for all purposes.

BACKGROUND

The present invention relates to storage sub-systems and, more particularly, to a storage sub-system for a computer comprising write-once memory devices and write-many memory devices.

Storage capacities of non-volatile memory devices continue to increase. Accordingly, from a technical standpoint, non-volatile memory devices may be used as a primary storage sub-system for a computer.

However, such an approach presents challenges, the first of which is cost. Present solid state non-volatile memory sub-systems may include Flash memory devices. Present memory devices may include one-time programmable (OTP) and read-write (RW) memory regions on the same device. Such approaches may be expensive.

Another challenge is protection of critical portions of the code used to run computers. Such code is subject to malicious code and overwriting by hackers. Present solid state non-volatile memory sub-systems for computers may fail to protect the critical portions of the code.

A more affordable solid state non-volatile memory sub-system including storage space for critical operating code that is protected from overwrite is desirable.

SUMMARY

In a first aspect of the invention, a solid state non-volatile storage sub-system of a computer is provided that includes a write-many storage sub-system memory device including write-many memory cells, a write-once storage sub-system memory device including write-once memory cells, and a page-based interface that is adapted to read and write the write-once and write-many storage sub-system memory devices.

In a second aspect of the invention, a solid state non-volatile storage sub-system of a computer is provided that includes a first storage sub-system memory device, a second storage sub-system memory device, and a control to control at least one of the first and second storage sub-system memory devices to be a write-once storage sub-system memory device.

In a third aspect of the invention, a solid state non-volatile storage sub-system of a computer is provided that includes means of the storage sub-system for storing data and means for controlling at least a portion of the means for storing data to be a write-once means for storing data.

In a fourth aspect of the invention, a solid state non-volatile storage sub-system of a computer is provided that includes a write-once storage sub-system memory device.

In a fifth aspect of the invention, a solid state non-volatile storage sub-system of a computer is provided that includes a control to control a storage sub-system memory device to be a write-once storage sub-system memory device.

In a sixth aspect of the invention, a storage method is provided that includes receiving, in a storage sub-system, data to be stored, and storing the data in one of a write-once storage sub-system memory device and a write-many storage sub-system memory device.

In a seventh aspect of the invention, a recoverable system method is provided that includes storing data comprising a first system configuration in a write-once memory device, storing data comprising a second system configuration in a write-many memory device, and restoring the system using the first system configuration.

Other features and aspects of the present invention will become more fully apparent from the following detailed description, the appended claims and the accompanying drawings.

BRIEF DESCRIPTION OF THE DRAWINGS

FIG. 4C is a schematic representation of a logical organization of a first embodiment of a memory array of the solid state non-volatile sub-system of FIG. 4A; and FIG. 5 is a schematic representation of a logical organization of a second embodiment of a memory array of the solid state non-volatile sub-system of FIG. 4A.

DETAILED DESCRIPTION

As stated above, present solid state non-volatile memory sub-systems may be expensive, and may fail to protect critical portions of the code used to run a computer.

In accordance with an embodiment of the present invention, a solid state non-volatile storage sub-system of a computer may be provided with both write-once portions and write many portions. For example, in an embodiment, a solid state non-volatile storage sub-system may include a write-once storage sub-system memory device and a write-many storage sub-system memory device.

In accordance with an embodiment of the present invention, critical file system structures, such as a master boot record (MBR), a partition boot record (PBR), and a file allocation table (FAT), may be stored in a write-once storage sub-system memory device so as to protect the critical file system structures from overwrite.

In accordance with an embodiment of the present invention, the write-once and write-many storage sub-system devices may use a page-based interface for read and write operations.

In accordance with an embodiment of the present invention, the write-once storage sub-system device may include a recoverable system configuration that may be used to restore a configuration of the computer.

In accordance with an embodiment of the present invention, address redirection may be provided to enable write-many functionality even for write once memory address space.

Figure 1A:
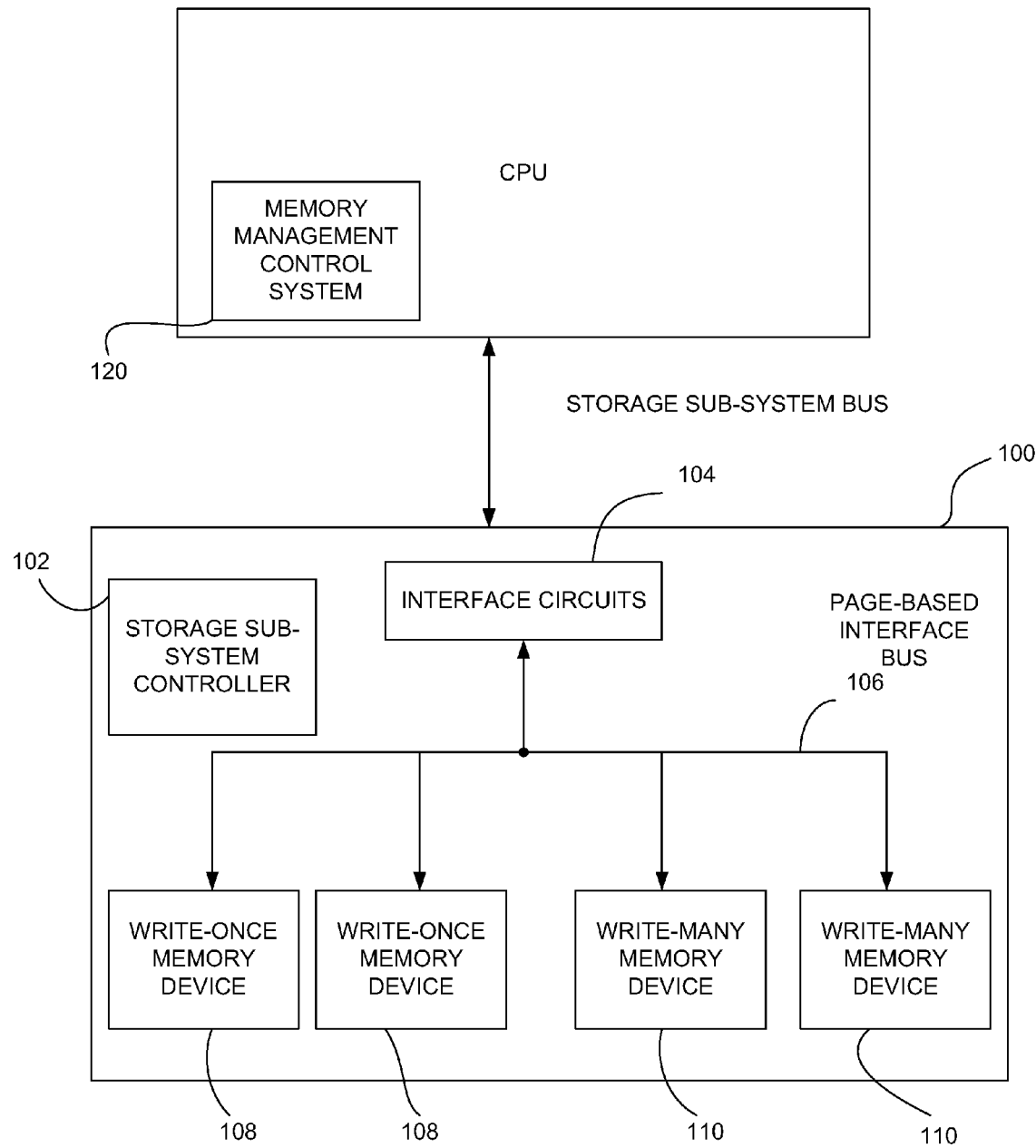
FIG. 1A is a block diagram of a solid state non-volatile storage sub-system of a computer according to a first embodiment of the present invention.

FIG. 1A is a block diagram of a solid state non-volatile storage sub-system 100 of a computer according to a first embodiment of the present invention. The storage sub-system 100 may include a storage sub-system controller 102. The storage sub-system controller 102 may control the storage sub-system 100. The storage sub-system 100 may include one or more interface circuits 104 linked via a page-based interface bus 106 to one or more write-once memory devices 108 and one or more write-many memory devices 110. The storage sub-system may be linked via a storage sub-system bus to a memory management control system 120 of a CPU of the computer.

Figure 1B:
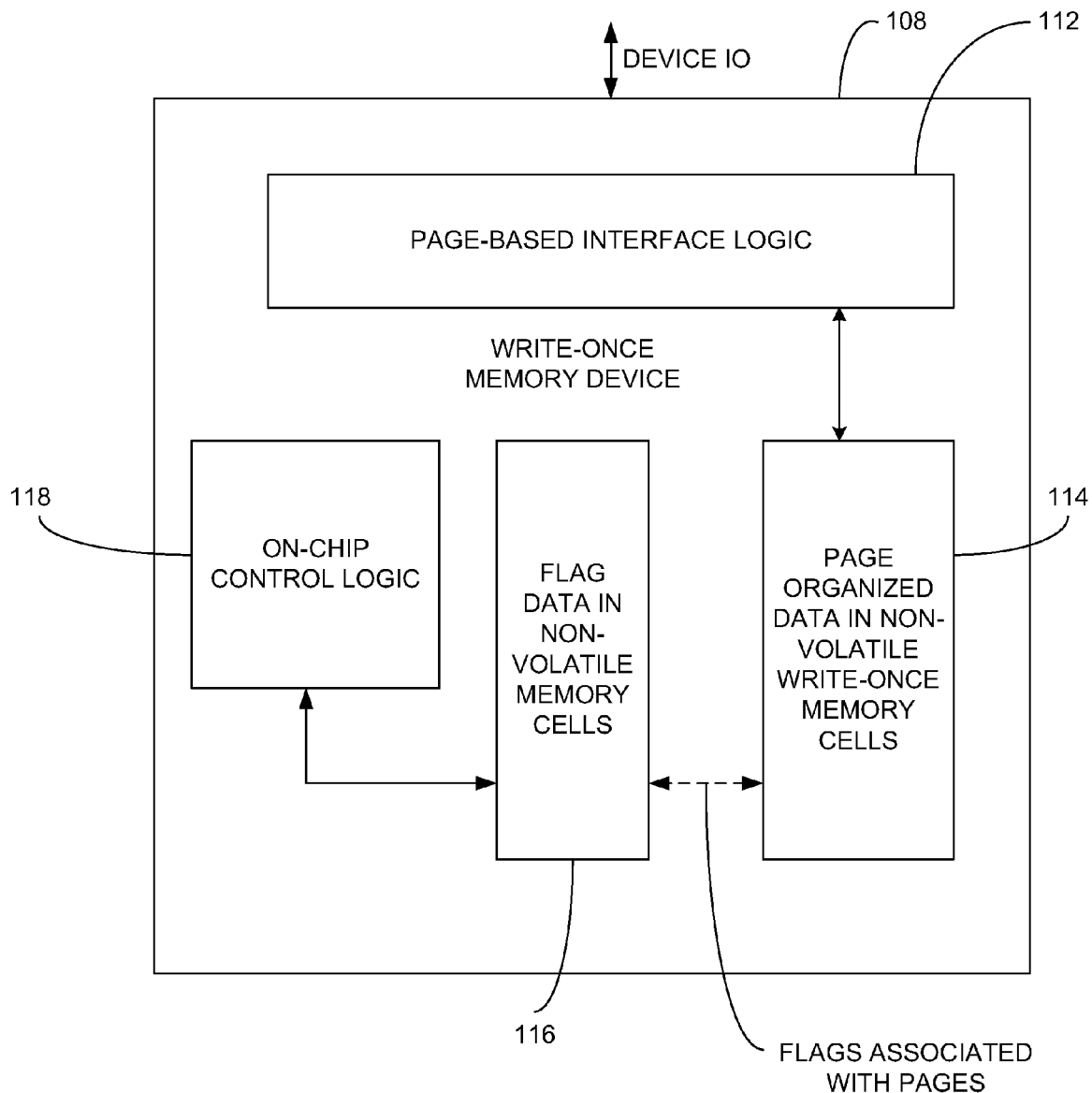
FIG. 1B is a block diagram of a write-once memory device of the storage sub-system of FIG. 1A.

FIG. 1B is a block diagram of a write-once memory device 108 of the storage sub-system 100 of FIG. 1A. The write-once memory device 108 may include page-based interface logic 112 that may be linked externally via a device input/output (I/O) and linked to page organized data in non-volatile write-once memory cells 114. The page-based interface logic 112 may be asynchronous. The write-once memory device 108 may include flag data in non-volatile memory cells 116. The flag data 116 may represent flags associated with pages of the page organized data 114. The write-once memory device 108 may include on-chip control logic 118 to read the flag data 116.

Figure 6:
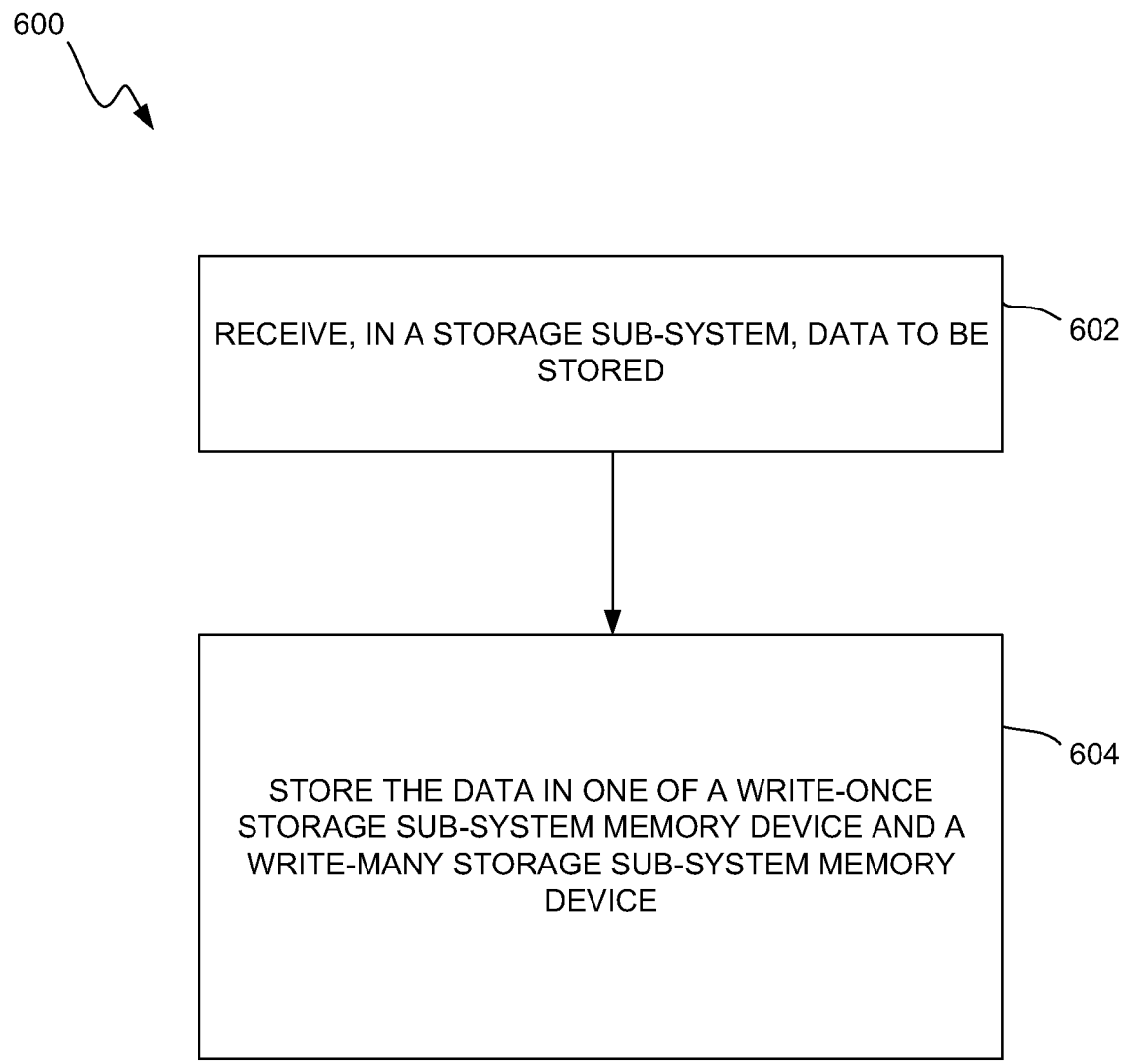
FIG. 6 is a flowchart of a storage method of a solid state non-volatile storage sub-system, such as the storage sub-system of FIG. 1.

The one or more write-once memory devices 108 and one or more write-many memory devices 110 may enable a storage method 600 such as that shown in FIG. 6. The storage method 600 may include receiving, in the storage sub-system 100, data to be stored in step 602, and storing the data to be stored in at least one of the one or more write-once memory devices 108 and the one or more write-many memory devices 110 in step 604.

In operation, the write-once memory device 108 may be a write-once-read-many-times (WORM) memory device in that the device 108 may prevent overwrite of written data. The flag data in non-volatile memory cells 116 representing flags associated with pages of the page organized data in non-volatile write-once memory cells 114 may indicate to the on-chip control logic 118 that a page has been written and may not be overwritten. A write command for the write-once memory device 108 may result in an error message being passed to a memory management control system 120 of the computer. In an embodiment, the one or more write-many memory devices 110 may include (or store) significant file system structures of the computer, such as a MBR, a PBR, and a FAT. Other file system structures may be stored in one or more write-once memory device 108. Accordingly, structures that are updated often may be easily updated while structures that are not may be protected in one or more write-once memory device.

Figure 2:
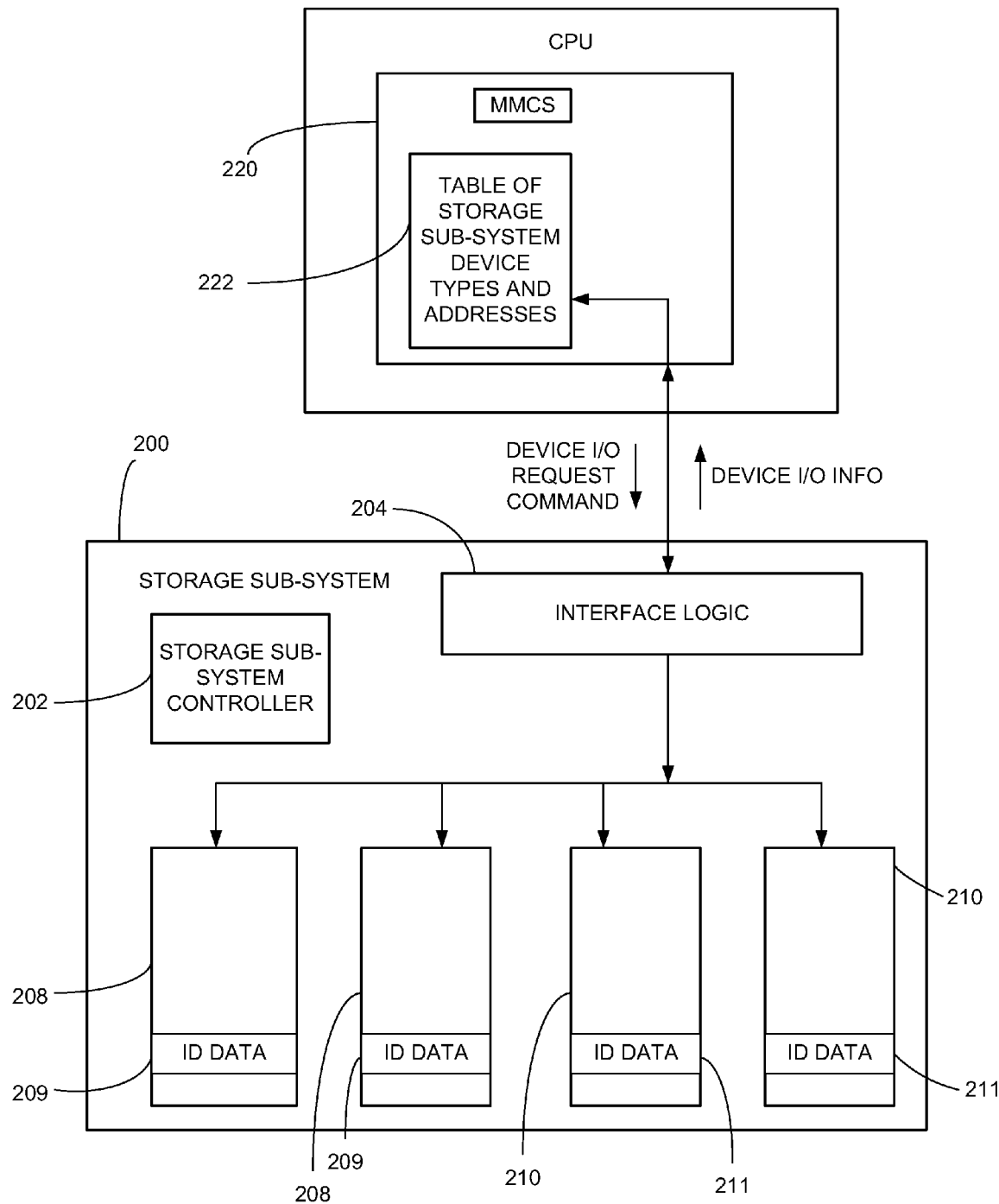
FIG. 2 is a block diagram of a solid state non-volatile storage sub-system of a computer according to a second embodiment of the present invention.

FIG. 2 is a block diagram of a solid state non-volatile storage sub-system 200 of a computer according to a second embodiment of the present invention. The storage sub-system 200 may include a storage sub-system controller 202. The storage sub-system controller 202 may control the storage sub-system 200. The storage sub-system 200 may include interface logic 204 linked to one or more write-once memory devices 208 and one or more write-many memory devices 210. The storage sub-system may be linked to a memory management control system 220 of a CPU of the computer.

The one or more write-once memory devices 208 and the one or more write-many memory devices 210 may include identification (ID) data 209, 211. The one or more write-once memory devices 208 and write-many memory devices 210 may be tracked in a table of storage sub-system device types and addresses 222. The table 222 may be accessible by the memory management control system 220 of the computer.

In operation, an ID command may be received by the storage sub-system 200 that may result in a response from the one or more write-once memory devices 208 and write-many memory devises 210 identifying each device as a write-once or write-many memory device based on the ID data 209, 211. Based on the resulting responses, the table of storage sub-system device types and addresses 222 may be created. The memory management control system 220 of the computer may store and use the table 222 to determine addresses for pages to be written and pages that may contain updated file structure information. The memory management control system 220 may read a MBR, a PBR, a FAT, and other directory structure data in write-once address space (e.g., a write-once memory device 208), and prevent erase or rewriting to address space that has previously been written to. Required erase and rewriting data may be redirected to write-many address space (e.g., a write-many memory device 210) and an updatable MBR, PBR, FAT, and directory structure.

Figure 3:
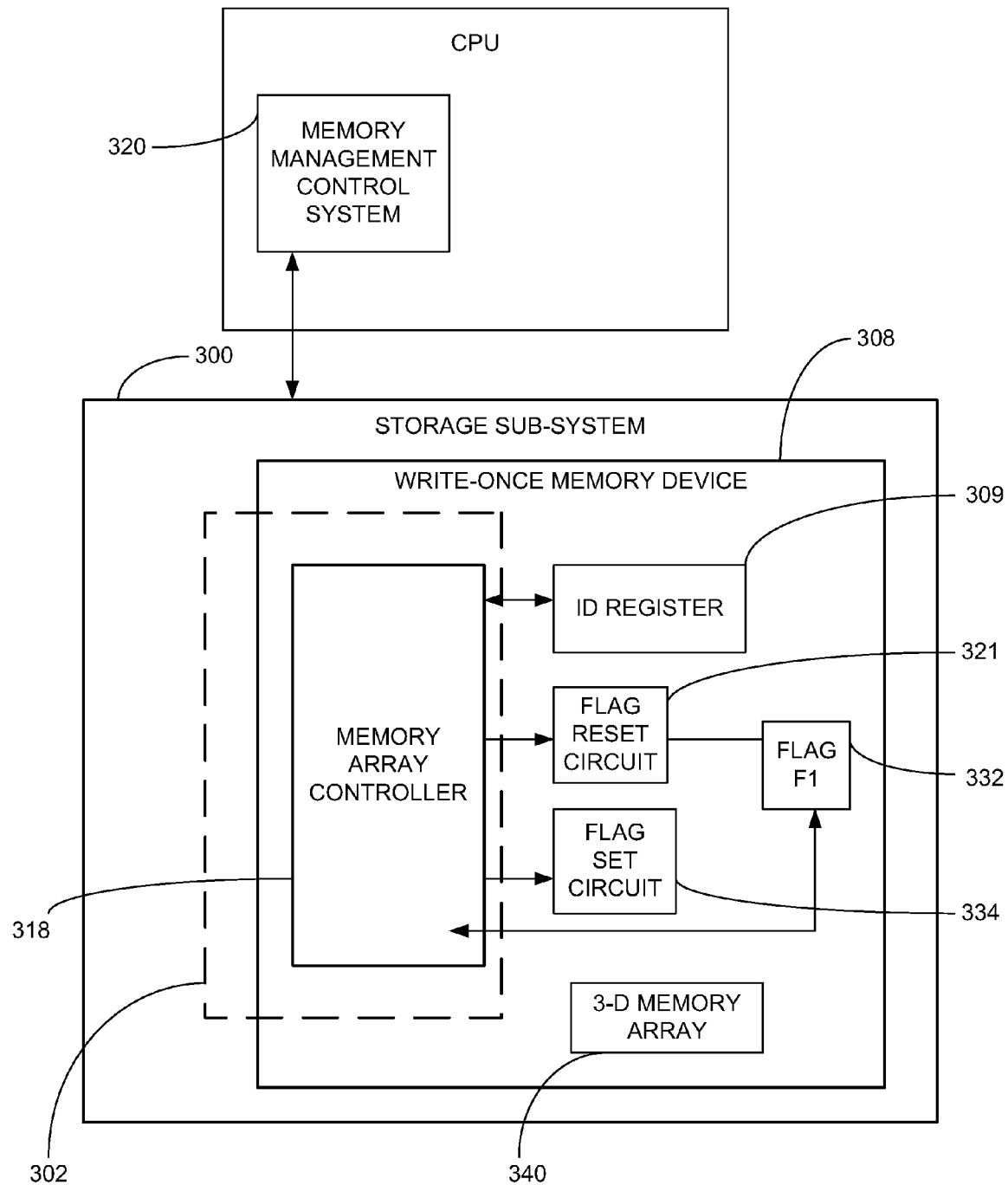
FIG. 3 is a block diagram of a solid state non-volatile storage sub-system of a computer according to a third embodiment of the present invention.

FIG. 3 is a block diagram of a solid state non-volatile storage sub-system 300 of a computer according to a third embodiment of the present invention. The storage sub-system 300 may include one or more write-once memory devices 308. A suitable write-once memory device and accompanying system are described in Bosch et al. U.S. Pat. No. 6,424,581, which is hereby incorporated by reference in its entirety.

The storage sub-system 300 may include a storage sub-system controller 302. The storage sub-system controller 302 may include or be in communication with a memory array controller 318 of a write-once memory device 308 to identify write-once memory devices and prevent overwriting or erasing of write-once memory cells in the one or more write-once memory devices 308. The write-once memory device 308 may include an ID register 309, a flag reset circuit 321, a flag register 332 storing a flag F1, a flag set circuit 334, and a memory array 340.

In operation, the memory array controller 318 may prevent writing and erasing from the memory array 340 unless the flag F1 is in a selected state. The storage sub-system 300 or the memory management control system 320 may automatically determine that the write-once memory device 308 is a write-once device. Upon such determination, a recognition signal may be sent to the write-once memory device 308.

Upon receipt of the recognition signal, the flag set circuit 334 may automatically set the flag F1 in response to the recognition signal. The write-once memory device 308 may automatically refuse to implement write and erase commands prior to receipt of the recognition signal and setting of the flag F1. The write-once memory device 308 may implement write and erase commands subsequent to receipt of the recognition signal and setting of the flag F1. The write-once memory device 308 may implement nondestructive commands such as read and status commands regardless of the state of the flag F1.

Figure 4A:
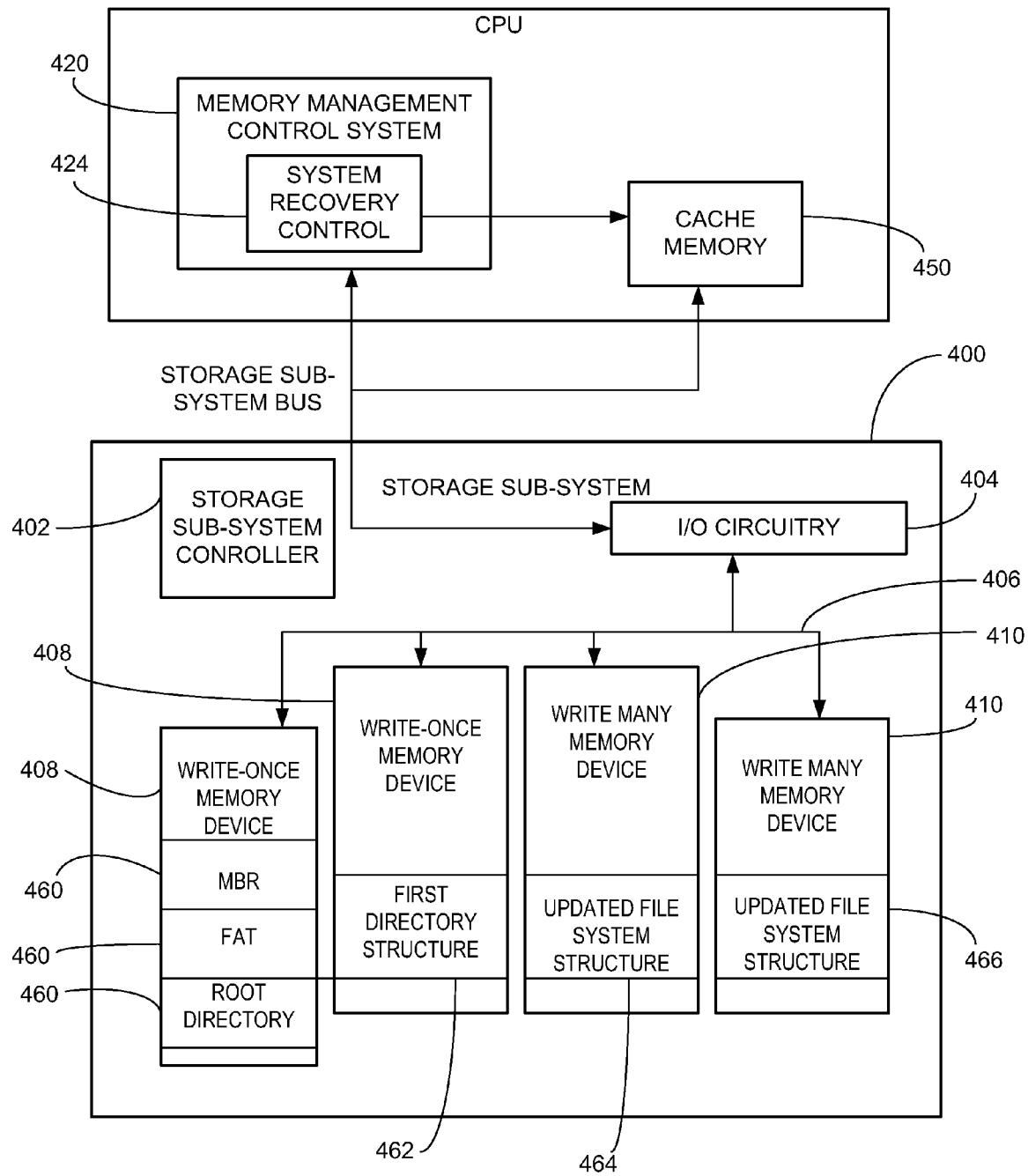
FIG. 4A is a block diagram of a solid state non-volatile storage sub-system of a computer according to a fourth embodiment of the present invention.

FIG. 4A is a block diagram of a solid state non-volatile storage sub-system 400 of a computer according to a fourth embodiment of the present invention. The fourth embodiment may be similar to the first embodiment (described above with reference to FIGS. 1A and B). The fourth embodiment may include pointers to enable updated file system structures and reuse of first file system structures for system recovery. Suitable pointers are described in Moore et al. U.S. Pat. No. 7,062,602, which is hereby incorporated by reference in its entirety.

The storage sub-system 400 may include a storage sub-system controller 402. The storage sub-system controller 402 may control the storage sub-system 400. The storage sub-system 400 may include I/O circuitry 404 linked via a page-based interface bus 406 to one or more write-once memory devices 408 and one or more write-many memory devices 410. The page-based interface bus 406 may transmit addresses, commands, and data among the I/O circuitry 404, the one or more write-once memory devices 408, and the one or more write-many memory devices 410. The one or more write-once memory devices 408 may include a recoverable system configuration 460, 462. The recoverable system configuration 460, 462 may include associated file system structures, such as a MBR, a PBR, a FAT, and a directory structure.

The recoverable system configuration 460, 462 may be written to the one or more write-once memory devices 408 during manufacturing and configuration of the computer before delivery to an end-user. One or more write-many memory devices 410 may include updated file system structures 464, 466.

In operation, data traffic control between a CPU of the computer and the storage sub-system 400 may prevent updated file system structures from overwriting the recoverable system configuration 460, 462. Data traffic from the one or more write-once memory devices 408 to the CPU may be redirected using updated file system structure information 464, 466 stored in the one or more write-many memory devices 410.

A system recovery control 424 of a memory management control system may be activated. Under the control of the system recovery control 424, the recoverable system configuration associated file system structures 460, 462 may be read, and the recoverable system configuration 460, 462 may be activated.

Figure 4B:
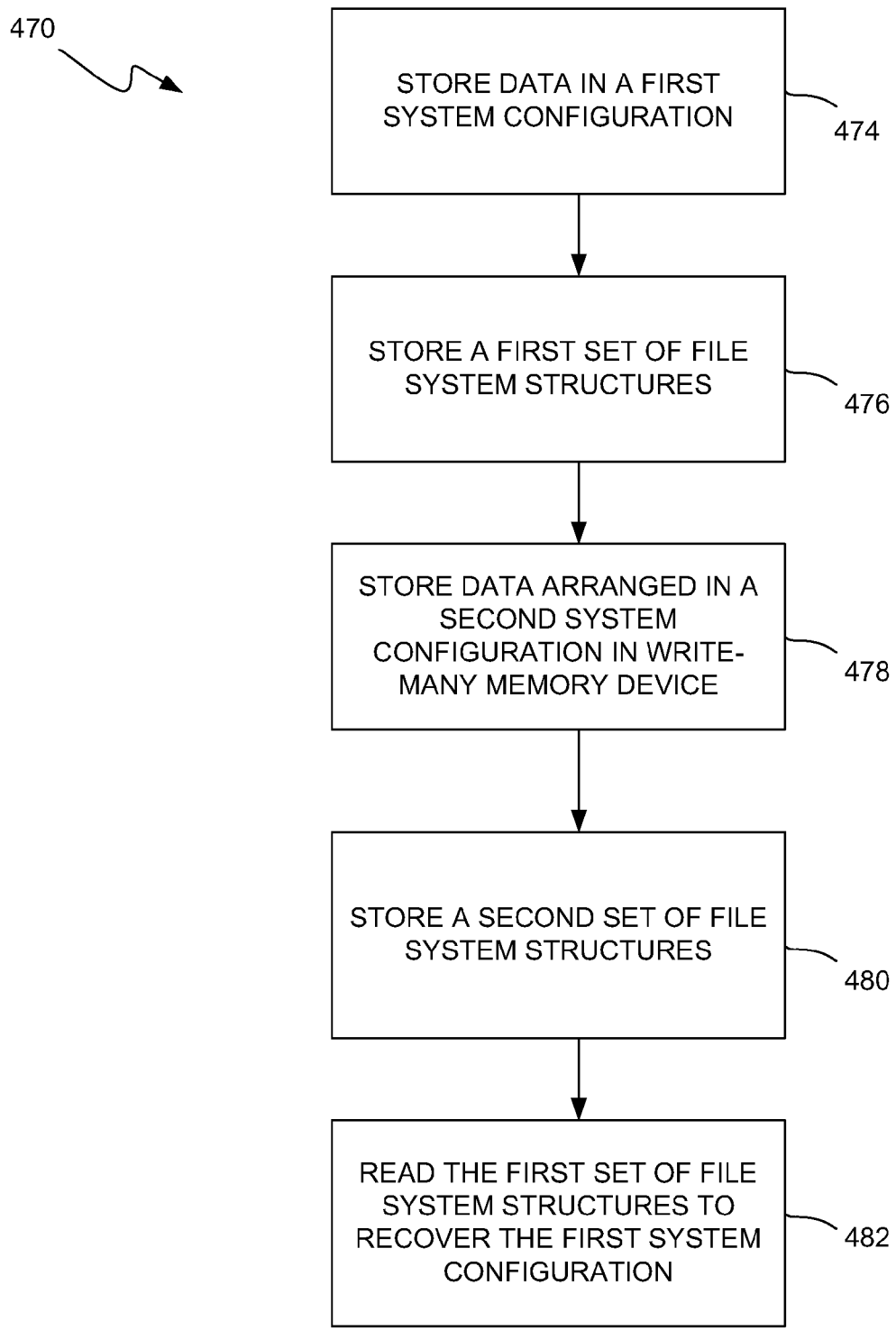
FIG. 4B is a flowchart of a recoverable system method of the solid state non-volatile sub-system of FIG. 4A.

FIG. 4B is a flowchart of a recoverable system method 470 of the solid state non-volatile sub-system of FIG. 4A. In operation 474, data comprising a first system configuration may be stored during a first session in one or more write-once memory devices 408. In operation 476, a first set of file system structures (e.g., the recoverable system configuration associated file system structures 460, 462) may be stored. In operation 478, data comprising second system configuration may be stored during a second session in one or more write-many memory devices 410. In operation 480, a second set of file system structures may be stored. In operation 482, the first set of file system structures (e.g., the recoverable system configuration associated file system structures 460, 462) may be read to recover the first system configuration.

FIG. 4C is a schematic representation of a logical organization of a first embodiment of a memory array of the solid state non-volatile sub-system 400 of FIG. 4A. The memory array may include significant file system structures 492 of the computer, such as the MBR, PBR, FATS, and root directory (ROOTDIR). The memory array may include data from a first session 490. The memory array may further include a second set of significant file system structures 494, and pointers 496 to enable the second set of significant file system structures 494 to function as the significant file system structures 492. The pointers 496 may enable system recovery using the significant file system structures 492.

FIG. 5 is a schematic representation of a logical organization of a second embodiment of a memory array of the solid state non-volatile sub-system of FIG. 4A according to a fifth embodiment of the present invention. The fifth embodiment may include address redirection to provide write-many functionality even for write-once memory address space. Suitable address redirection techniques are described in U.S. Pat. No. 7,062,602, previously incorporated.

Previously unused memory cells (either write-once or write-many) may store updated pages that may be directed to previously written pages. In an embodiment, data stored in the one or more write-once memory devices 408 may be rarely updated. An operating system or initial configuration software may use information indicating write-once versus write-many address space and store data that is least likely to be updated in the write-once address space and data that is most likely to be updated in the write-many address space. Data that is read frequently, such as boot code, low level system functions, essential operating system programs, may be stored in the write-once address space (e.g., the one or more write-once memory devices 408). In some embodiments, a 3D antifuse memory array write-once memory device may be used.

Turning back to FIG. 5, the memory array may include significant file system structures 502 of the computer, such as the MBR, PBR, FATS, and ROOTDIR. The memory array may include data from a first session 500 and data from a second session 508. The memory array may include a second set of file system structures 510. The system may include file structures 504 for a write-once file system. The memory array may include pointers 506. The pointers 506 may be stored in write-once address space. As illustrated in FIG. 5, data in the memory device may be written in more than one session. Further, there may be a flexible amount of data between the significant file system structures 502 and the revised (or second set) of file system structures 510.

A first pointer may be used to find the significant file system structures 502, that may be in the one or more write-once memory devices 408. When reprogramming of data pages or reprogramming of the significant file system structures 502 is required, additional pointers may be used to redirect access to one or more write-many memory devices or a fresh write-once memory device to store the second set of file system structures 510. The storage sub-system controller 402 may include address chain sequencer logic to access the valid file system structures. Write-state flags and Nxtaddr flags, as described in U.S. Pat. No. 7,062,602, previously incorporated, may be accessed by the address chain sequencer logic. In an embodiment, access to other file system structures and even data files may use address chain sequencing to redirect addresses. In an embodiment, alternative redirection methods are used either alone or in combination with address chain sequencing.

The foregoing description discloses only exemplary embodiments of the invention. Modifications of the above disclosed apparatus and methods which fall within the scope of the invention will be readily apparent to those of ordinary skill in the art. For example, although the embodiments of the present invention have been described primarily with regard to storage sub-systems of a computer, it will be understood that the storage sub-systems may be applied in other environments. Further, the functionality of the various features of the described embodiments of the present invention may be distributed differently. For example, the functionality of two separate features may be combined within one single feature.

Accordingly, while the present invention has been disclosed in connection with exemplary embodiments thereof, it should be understood that other embodiments may fall within the spirit and scope of the invention, as defined by the following claims.

The invention claimed is:

1. A solid state non-volatile storage sub-system of a computer, comprising:
 a write-many storage sub-system memory device comprising write-many memory cells; and
 a write-once storage sub-system memory device comprising write-once memory cells; wherein:
 the write-once storage sub-system memory device and the write-many storage sub-system memory device form a single storage sub-system memory device, the single storage sub-system memory device comprising a memory array that comprises:
 a first set of significant file system structures of the computer;
 a second set of significant file system structures of the computer; and
 pointers to at least one of the first set of significant file system structures and the second set of significant file system structures, wherein:
 the pointers enable recovery of the computer using the first set of significant file system structures.

2. The storage sub-system of claim 1, wherein the computer comprises a personal computer.

3. The storage sub-system of claim 1, wherein the write-once storage sub-system memory device comprises a write-once-read-many-times (WORM) memory device.

4. The storage sub-system of claim 3, further comprising a chip associated with the WORM memory device, wherein the chip includes an indication whether the WORM memory device has been written to.

5. The storage sub-system of claim 4, wherein the indication whether the WORM memory device has been written to comprises a flag associated with a page of the WORM memory, the flag indicating whether the page has been written to.

6. The storage sub-system of claim 1, wherein the write-many storage sub-system memory device comprises at least one file system structure of the group consisting of a master boot record (MBR), a partition boot record (PBR), and a file allocation table (FAT).

7. The storage sub-system of claim 1, wherein the write-once storage sub-system memory device comprises an identifier to identify the write-once storage sub-system memory device as write-once memory.

8. The storage sub-system of claim 1, wherein the write-many storage sub-system memory device comprises an identifier to identify the write-many storage sub-system memory device as write-many memory.

9. The storage sub-system of claim 1, wherein the computer comprises a table of page address space indicating at least one of the write-once storage sub-system memory device as write-once memory, and the write-many storage sub-system memory device as write-many memory.

10. The storage sub-system of claim 1, wherein the write-once storage sub-system memory device comprises at least one file system structure of the group consisting of a master boot record (MBR), a partition boot record (PBR), and a file allocation table (FAT).

11. The storage sub-system of claim 1, wherein the write-once storage sub-system memory device comprises a flag, wherein the write-once memory storage sub-system memory device prevents writing and erasing operations unless the flag is in a selected state.

12. The storage sub-system of claim 11, wherein the flag is set to the selected state upon receipt of a write-once recognition signal.

13. The storage sub-system of claim 1, wherein the write-once storage sub-system memory device comprises a recoverable system configuration.

14. The storage sub-system of claim 13, wherein the recoverable system configuration comprises at least one file system structure of the group consisting of a master boot record (MBR), a partition boot record (PBR), a file allocation table (FAT), and a directory structure.

15. The storage sub-system of claim 13, further comprising a control to control traffic between a CPU of the computer and the storage sub-system to prevent an updated file system structure from overwriting the recoverable system configuration.

16. The storage sub-system of claim 13, wherein the recoverable system configuration is activated by a system recovery control of a memory management control system.

17. The storage sub-system of claim 1, wherein the write-many storage sub-system memory device comprises an updated file system structure.

18. The storage sub-system of claim 17, further comprising a control to redirect traffic between the write-once memory device and a CPU using the updated file system structure.

19. The storage sub-system of claim 1, further comprising a page-based interface that is adapted to read and write the write-once and write-many storage sub-system memory devices.

* * * * *